(12) United States Patent
Davis et al.

(10) Patent No.: US 8,774,587 B1
(45) Date of Patent: Jul. 8, 2014

(54) STRESS CONTROL STRUCTURE FOR OPTICAL FIBERS IN A HIGH VOLTAGE ENVIRONMENT

(71) Applicant: Optisense Network, LLC, Plano, TX (US)

(72) Inventors: Philip B. Davis, Richardson, TX (US); Stephen Prince, Frisco, TX (US); Grant Kenworthy, Allen, TX (US); Edward Condon, Murphy, TX (US)

(*) Notice: Subject to any disclaimer, the term of this patent is extended or adjusted under 35 U.S.C. 154(b) by 0 days.

(21) Appl. No.: 13/751,069

(22) Filed: Jan. 26, 2013

(51) Int. Cl.
*G02B 6/00* (2006.01)
*G02B 6/44* (2006.01)

(52) U.S. Cl.
CPC .................... *G02B 6/4417* (2013.01)
USPC ........................................ 385/135

(58) Field of Classification Search
CPC .. G02B 6/4416; G02B 6/4417; G02B 6/4419; G02B 6/4429; G02B 6/4434; H01B 11/22
USPC ................................. 385/103, 135
See application file for complete search history.

(56) References Cited

U.S. PATENT DOCUMENTS

| | | |
|---|---|---|
| 3,515,798 A | 6/1970 | Sievert |
| 4,017,652 A | 4/1977 | Gruber |
| 4,363,842 A | 12/1982 | Nelson |
| 4,383,131 A | 5/1983 | Clabburn |
| 4,610,033 A | 9/1986 | Fox |
| 4,613,727 A | 9/1986 | Salanki |
| 4,717,237 A | 1/1988 | Austin |
| 4,772,090 A * | 9/1988 | Atkins et al. .................. 385/101 |
| 4,802,731 A | 2/1989 | Maschek |
| 5,124,634 A | 6/1992 | Ulmer |
| 5,268,983 A | 12/1993 | Tatarka |
| 5,455,383 A | 10/1995 | Tanaka |
| 5,553,173 A * | 9/1996 | Lutz et al. ....................... 385/12 |
| 5,594,827 A | 1/1997 | Joulie |
| 5,804,630 A | 9/1998 | Heyer |
| 6,015,625 A | 1/2000 | Morizono et al. |
| 6,015,629 A | 1/2000 | Heyer |
| 6,051,796 A | 4/2000 | Kuhl |
| 6,215,940 B1 | 4/2001 | Johnson |
| 6,340,794 B1 | 1/2002 | Wandmacher |
| 6,348,781 B1 | 2/2002 | Midya |
| 6,348,786 B1 | 2/2002 | Bjarme |
| 7,373,056 B2 | 5/2008 | Bohnert et al. |
| 7,683,795 B2 | 3/2010 | Bjorn |
| 7,880,961 B1 * | 2/2011 | Feve et al. .................. 359/341.1 |
| 8,005,324 B2 * | 8/2011 | Bremnes ......................... 385/12 |
| 8,076,925 B2 | 12/2011 | Harlev |
| 2009/0220188 A1 * | 9/2009 | Bremnes ......................... 385/12 |

FOREIGN PATENT DOCUMENTS

RU 2363024 C1 7/2009

OTHER PUBLICATIONS

International Search Report corresponding to co-pending International Patent Application Serial No. PCT/US2013/027928, Russia Patent Office, dated Oct. 18, 2013; (3 pages).
International Written Opinion corresponding to co-pending International Patent Application Serial No. PCT/US2013/027928, Russia Patent Office, dated Oct. 18, 2013; (3 pages).

* cited by examiner

*Primary Examiner* — Charlie Peng
(74) *Attorney, Agent, or Firm* — Nixon Peabody LLP

(57) ABSTRACT

Structure is provided for controlling the electrical stress on one or more optical fibers in a high voltage environment.

53 Claims, 9 Drawing Sheets

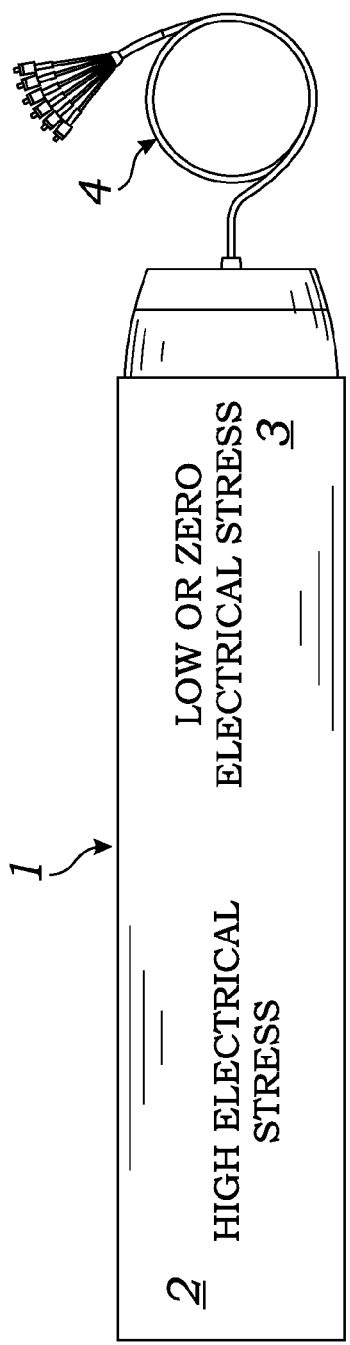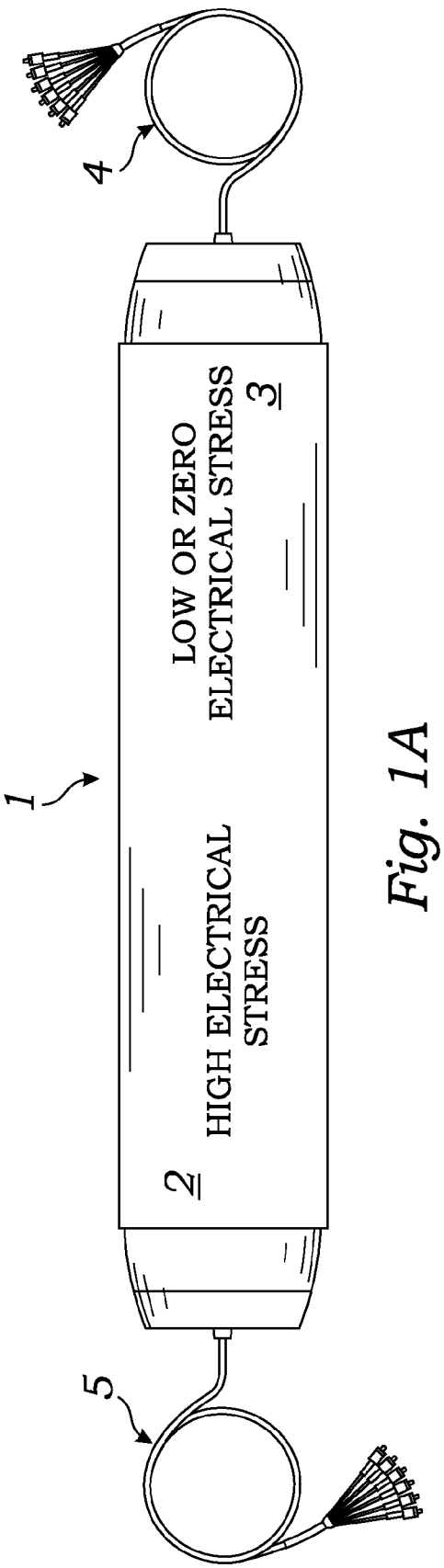

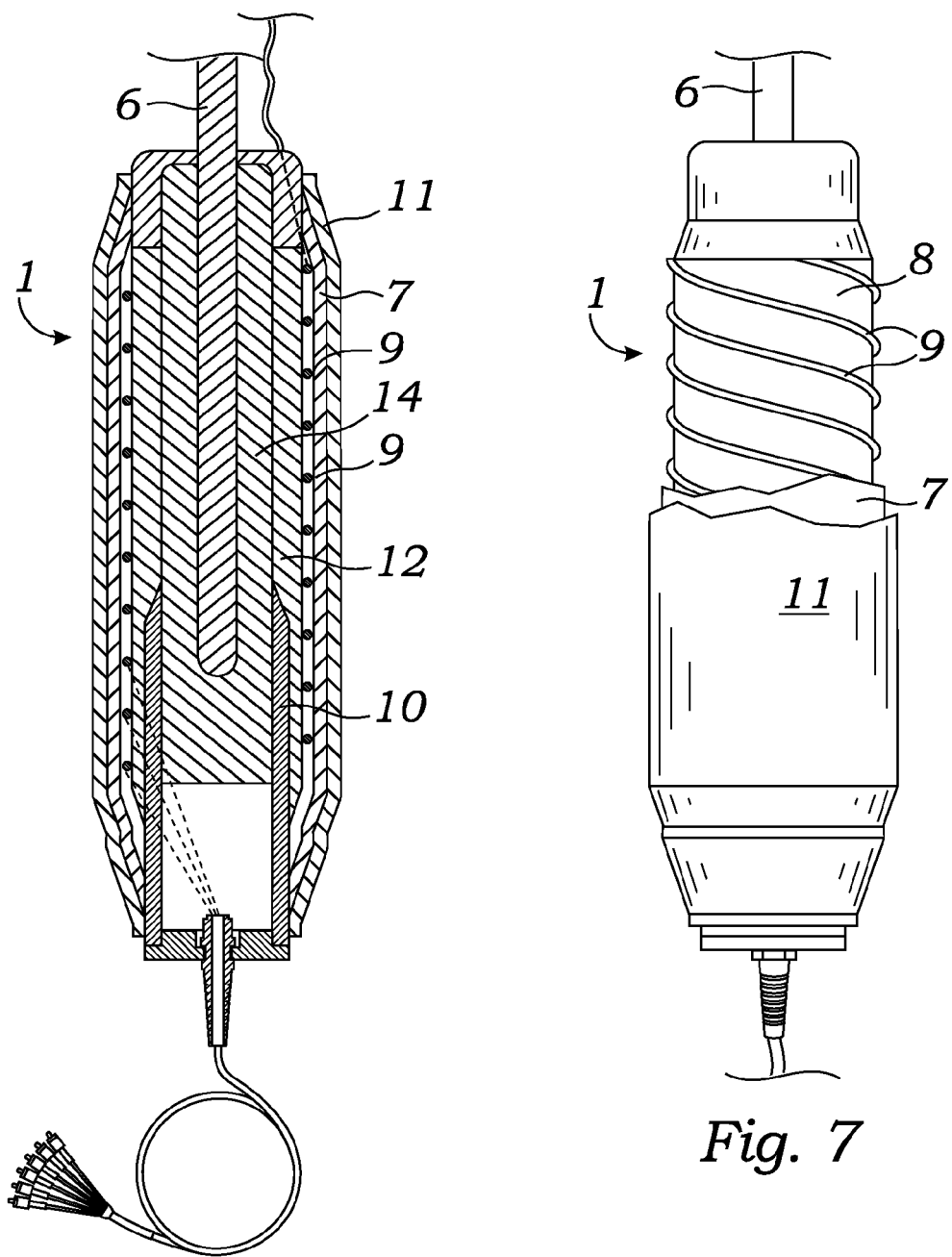
Fig. 6A
Fig. 7
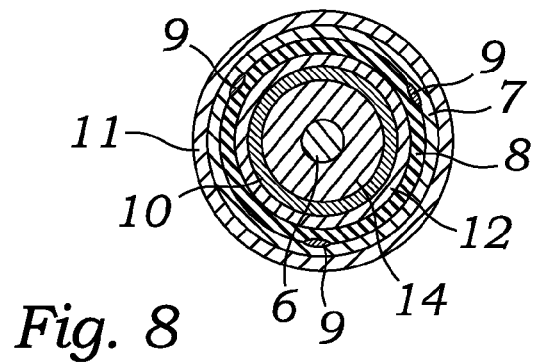
Fig. 8

STRESS CONTROL STRUCTURE FOR OPTICAL FIBERS IN A HIGH VOLTAGE ENVIRONMENT

BACKGROUND

1. Field of the Invention

The present invention relates to stress control structure for optical fibers in regions of high electrical stress down to a lower electrical stress, or zero electrical stress or ground. In particular, it involves selections and arrangements of dielectric layers and other layers associated with optical fibers originating elsewhere or originating in or traversing regions of high electrical field strength and the control of the stress to which the optical fibers are exposed.

2. Description of the Art

The advantages of optical fibers over other media for the conveyance of digital and electrical signals are well known. However, optical fibers placed in regions of high electrical field strength are susceptible to damage and failure from localized dielectric breakdown of the electrical insulation system in the vicinity of the optical fibers. This condition is intensified when a discontinuity exists in the shielding of a high voltage cable, sensing device or other electrical equipment.

The following and all other referenced patents and applications are incorporated herein by reference in their entirety. Definitions herein prevail over definitions in such references.

Some of the prior art is very useful in pointing out solutions to various problem areas. U.S. Pat. No. 6,215,940, for High Voltage Insulator for Optical Fibers, issued Apr. 10, 2001, which reference is incorporated herein, describes the various embodiments of flexible insulator sleeves, characteristics of the insulative support rod, (corresponding to insulative central structural element herein), preserving integrity of the optical fibers, cushioning between the optical fibers and the support rod, problem of voids, (air gaps), moisture, and other aspects. This reference also points out that the length of the rod, (insulative central structural element herein), depends primarily upon the level of the (voltage) system on which it is used.

Also, U.S. Pat. No. 6,015,625, for Stress Control for Termination of a High Voltage Cable, issued Jan. 18, 2000, is incorporated herein by reference, providing test and design information as to stress control layers, including permittivity requirements, with improved corona discharge extinction, withstanding of power frequency voltage and impulse voltages, and in meeting the requirements of IEEE Standard Test procedures, STD 48-1990. That patent also provides helpful information as to exterior elastomeric coverings, (sleeves), and other types of exterior coverings, elimination of air pockets, as well as superiority of stress control material comprised of epihalohydrin rather than EPDM.

Elements:

1. Insulative Central Structural Element: The insulative central structural element is the innermost portion of the particular structure. Although other shapes may be used, it may be constructed of a longitudinal, central, circular, or somewhat circular, column, forming the body of the elongated portion of the structure. Whereas circular or near circular is the preferred shape, elliptical, triangular, square, hexagonal, octagonal and other multi-sided symmetric and asymmetric shapes might conceivably be used.

The insulative central structural element is formed from a material with good insulative properties at high voltages. In various embodiments of the invention, the structure may be comprised of ceramic, glass, porcelain, plastic, polycarbonate, phenol, or other materials which are suitably insulative and provide the strength required to support the physical structure. Although it is not necessary, the insulative central structural element may be made of high dielectric material.

In one embodiment, such structure may be a high voltage cable with all it accompanying layers.

The thickness of the insulative central structural element is determined by the dielectric strength of the insulator material, the applied high-voltage and the needed safety factor as determined by the application. Typical thickness for the insulative central structural element is between 0.5 and 1.25 inches for an applied high-voltage of 35 kV.

Voltages in high voltage distribution systems range from 4 kV to 75 kV with common voltages of, say, only as examples, 15 kV, 25 kV, 35 kV, 46 kV and 69 kV. The dielectric capability and size of the insulative central structural element would, of course, take into account differences in intended use.

2. Stress Control Layer: The stress control layer consists of a high permittivity material that is tightly-fitted around the insulative central structural element in such a way so as to create a void-free or substantially void-free interface. This high permittivity material manages the high-electrical stresses by creating a more evenly distributed e-field over the surface of the structure, significantly reducing the potential for insulation breakdowns that could result in partial discharge, withstand or Basic Insulation Level (BIL) failures. (Partial discharge occurs when a localized dielectric breakdown of the electrical insulation system under high voltage stress but not of sufficient magnitude to bridge the space between two conductors.)

The thickness of the stress control layer is typically 50 to 200 mils and in various embodiments of the invention, the material may be comprised of Ethylene-Propylene (EP), Ethylene-Propylene-Diene-Monomer (EPDM), rubber or silicon or other suitable materials having properties, with various additives, fillers and conductive particles so as to provide the needed permittivity.

3. Dielectric Layer: The dielectric layer consists of an elastomeric material with high dielectric strength that, in conjunction with a second layer of elastomeric material, form two layers that encapsulate the optical fibers, minimizing voids in the vicinity of the fibers. In one preferred embodiment, two dielectric layers are composed of the same material with self-fusing properties to minimize voids and with sufficient pliability to conform to the fiber radius; however the self-fusing property is not strictly required, but it is an advantageous embodiment. In various embodiments of the invention, the dielectric layer may be comprised of rubber, silicon, or other elastic materials with various additives and fillers to provide the needed dielectric material properties.

4. Optical Fiber: The optical fiber is a cylindrical dielectric waveguide, typically made of low-loss glass or plastic comprised of a central core which guides the optical signal surrounded by a cladding material of slightly lower refractive index. Light impinging on the core-cladding interface at an angle greater than the critical angle undergoes total internal reflection and is guided through the core. Fiber optical cable is familiar to those skilled in the art. The optical fiber, in this application, is used for the transmission of analog or digital data through a region of high electrical stress. "Light" as used herein includes, of course, much more of the electromagnetic spectrum than visible light. Both infrared and ultraviolet frequencies might be used. Infrared and near infrared are most common. Such wider meaning is commonly known in the art.

5. Dielectric Layer: The dielectric layer consists of an elastomeric material with high dielectric strength that, in conjunction with a first layer of elastomeric material, form two layers that encapsulate the optical fibers, minimizing voids in the vicinity of the fibers.

6. External Insulator: An external layer of insulative material is placed around the structure. The external insulator is very tightly-fitting. The external insulator may include "skirts" or "sheds" or "wings" to decrease the susceptibility to external arcing or tracking; known to those skilled in the art, or, as described, for example in U.S. Pat. No. 6,215,940. The external insulator must prevent electrical tracking and must be strong, tight-fitting, hydrophobic and be an effective "weathershed", providing protection against weather and harsh environmental conditions. It may be composed of highly insulative rubbers, silicone, various polymers and other suitable materials.

Depending of the application, the external insulator may not be required since this is primarily necessitated by exposure to weathering and harsh environmental conditions. In various embodiments of the invention, this layer can be eliminated or replaced with an alternate external layer suitable for the physical conditions to which the structure will be exposed.

In the preferred embodiment, the construction elements 1-6, as referenced above, describe the materials and methods used to construct the stress control insulating device of the invention. It is conceivable that either one or both of the dielectric layers (elements 3 and 5 above) could be omitted. In alternate embodiments of the invention, the various construction elements could be combined, performing the same physical and electrical functions, albeit with a reduced number of physical elements, but accomplishing the same functions.

A description of a current and voltage sensor, such as might be used in combination with the inventions herein, is found in patent application Ser. No. 135534886, filed Jul. 19, 2012, entitled, "OPTICAL SENSOR ASSEMBLY FOR INSTALLATION ON A CURRENT CARRYING CABLE. (Applicant will furnish updated information when received.) Such application is incorporated herein for reference purposes.

The various items used in the electrical constructions herein are commercially available. Most can be ordered by size, length, width, dielectric constant, conductivity and other characteristics. The needs for cable elements can be met over a wide range of voltages. Many suitable products are available from several suppliers. Of course, a wide range of optical fibers are also readily available.

SUMMARY OF THE INVENTION

"The present invention relates to providing control of the electrical stress on one or more optical fibers in a high voltage environment. The optical fibers may originate in a high voltage environment or elsewhere and then pass into such high voltage environment. Various layers of materials having particular electrical characteristics are described for reducing the high stress electrical field down to a lower stress electrical field or zero stress electrical field or to ground level, as the case may be, in order to protect the optical fibers and, of course, the information they are transmitting."

BRIEF DESCRIPTION OF THE DRAWINGS

FIG. 1 is a view of an embodiment of the invention, illustrating broadly, a stress control structure reducing a high electrical stress down to a lower electrical stress or zero electrical stress, providing for optical current fibers to pass from the high electrical stress area down to the lower electrical stress or to a zero electrical stress area. In this embodiment, the optical fibers originate in the high electrical stress area.

FIG. 1A is a view of another embodiment of the stress control structure, illustrating optical current fibers originating elsewhere than within the stress control structure.

FIG. 2A is a close-up cross-section of an optical fiber disposed between two conformable dielectric layers.

FIG. 6A is a cross-section view similar to that of FIG. 6, but with the optical fibers placed between the stress control layer and an outer dielectric layer.

FIG. 7 is an embodiment of FIG. 5, showing the outer protective cover and an outer dielectric layer broken away to show the optical fibers helically wound around an inner dielectric layer.

FIG. 8 is a cross-section view taken on line 8-8, of the embodiment of FIG. 5.

DETAILED DESCRIPTION

Figure 1B:
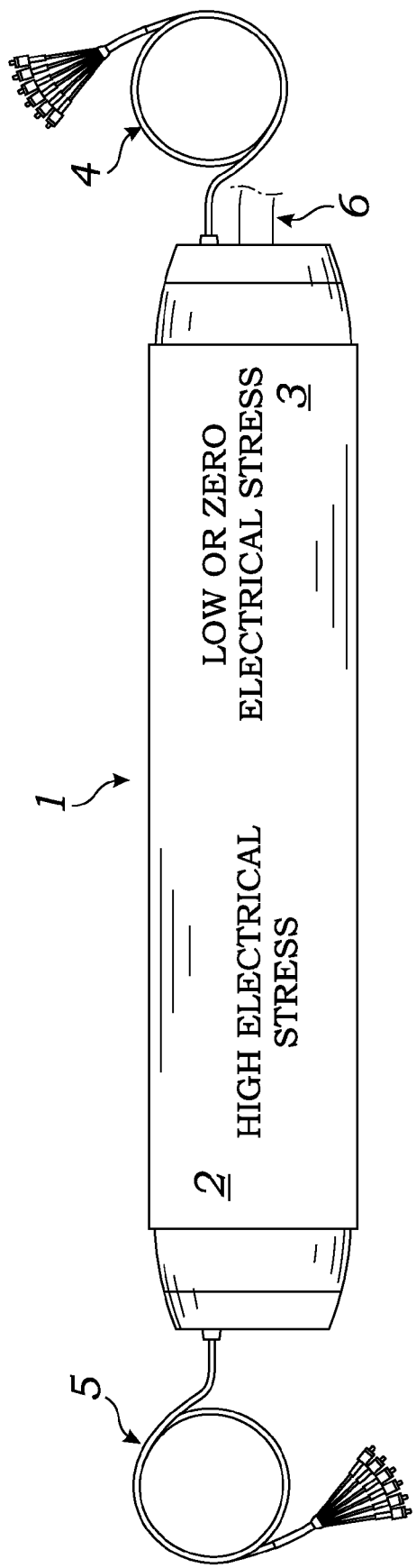
FIG. 1B is an illustration of a high voltage structure extending into a channel in the stress control structure.

FIG. 1 is a stress control structure 1, having optical fibers originating therein, in the high electrical stress area 2 of the stress control structure and passing out of the stress control structure through the low electrical stress or zero electrical stress area 3 as shown by exterior cables 4.

FIG. 1A illustrates a similar stress control structure 1. However, the optical fibers 5 extend into the high electrical stress area 2 from elsewhere. Then the optical fibers 5 extend to the low electrical stress 3 and on out of the stress control structure, as shown by cables 5.

FIG. 1B is an illustration of a high voltage structure 6 extending into a channel in the stress control structure 1. Also shown is the embodiment in which the optical fibers 5, (combined optical fibers), originate "elsewhere" and extend through the stress control structure 1 and provide output to optical fibers 4, (combined optical fibers).

Figures 2, 2A, 2B:
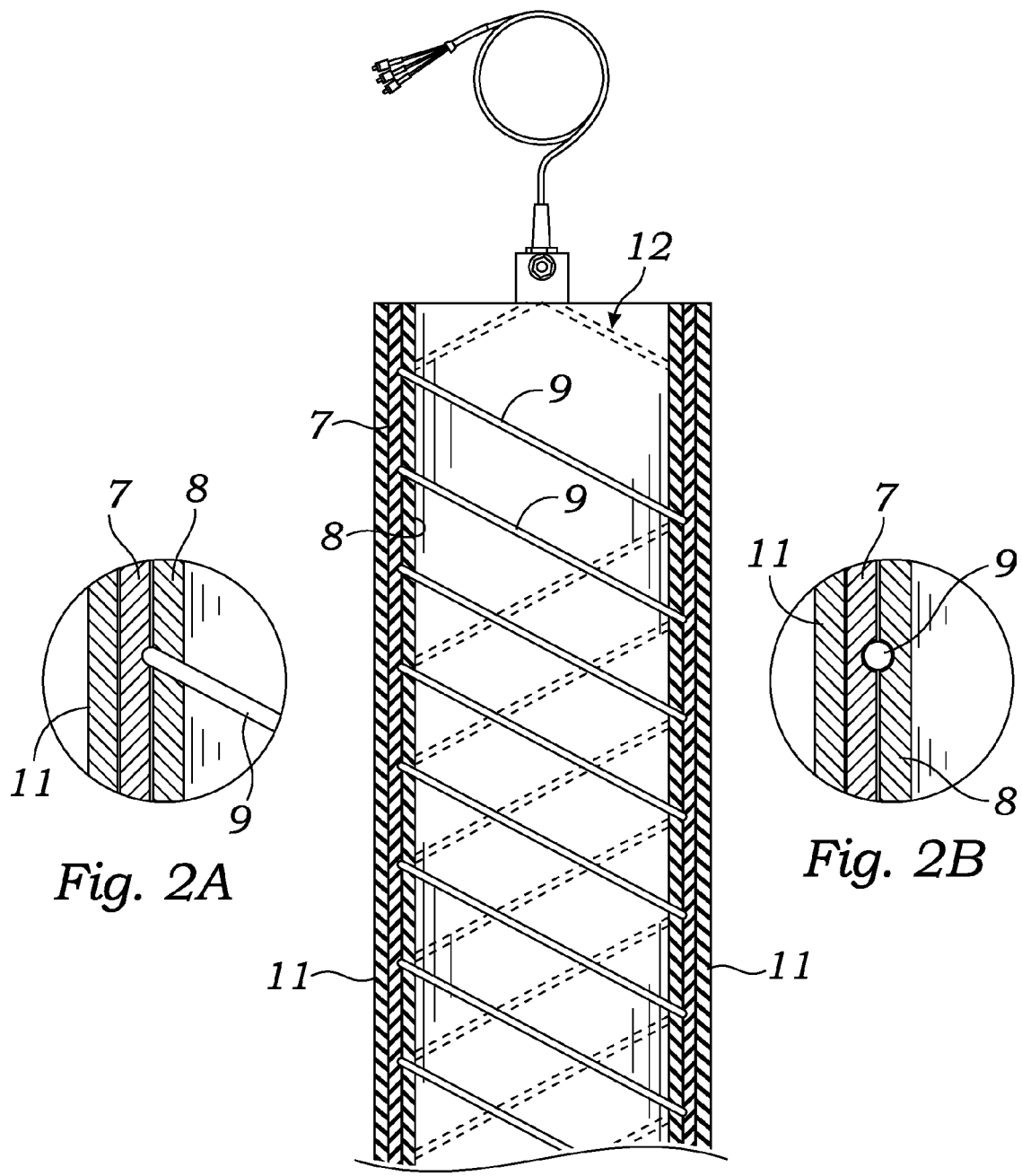
FIG. 2 is an embodiment in which is shown a cross-section of the layers outside the stress control layer which is shown in relief, and illustrating the disposition of a plurality of optical fibers in helical fashion between two layers of dielectric material.
FIG. 2A is a close-up view of the optical cables in relief emerging from between dielectric layers, shown in cross-section.
FIG. 2B is a cross-section view, showing the disposition of the optical cables in relief between dielectric layers shown in cross-section.

FIG. 2 is a view of the stress control structure that is partially broken away down to the stress control layer 12, which is the high permittivity, (high-dielectric), layer shown in relief, showing the two meandering dielectric layers 7 and 8 surrounding the individual fiber optical wires 9 and it also shows the outer protective layer 11.

FIG. 2 is a magnified cross-section of a small portion of the stress control layer 12, showing an optical fiber wire 9 surrounded by two dielectric layers 7 and 8 and a protective outer layer 11.

FIG. 2A is a close-up view of the optical cables 9, shown in relief, emerging from between dielectric layers 7 and 8, shown in cross-section. Outer protective layer 11 is also shown in cross-section.

FIG. 2B is a cross-section view, showing the disposition of the optical cables 9 between dielectric layers 7 and 8. Outer protective layer 11 is also shown in cross-section.

Figure 3:
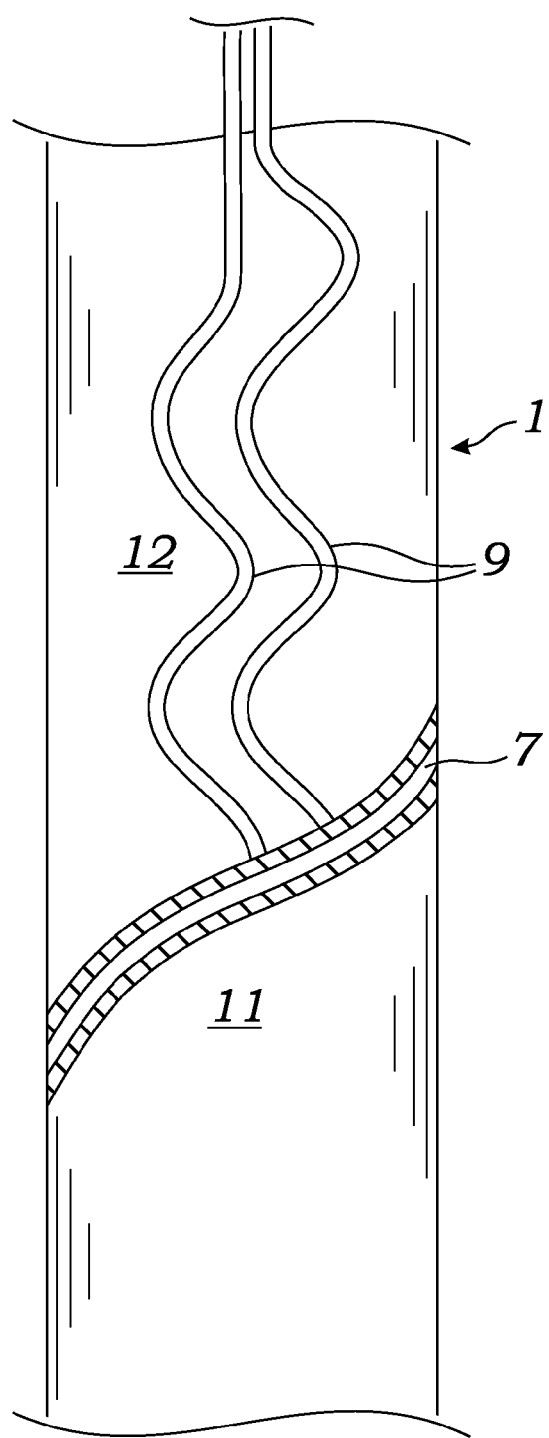
FIG. 3 is a breakaway view of the outer dielectric layer and the outer protective layer, down to the optical fibers layer, showing them disposed in meandering fashion.

FIG. 3 is an exterior view of the stress control structure 1, having a breakaway of the outer layer 11 down to outer dielectric layer 7, down to the optical fibers 9, showing them disposed in meandering fashion between dielectric layer 7 and stress control layer 12 of high permittivity.

Figure 4:
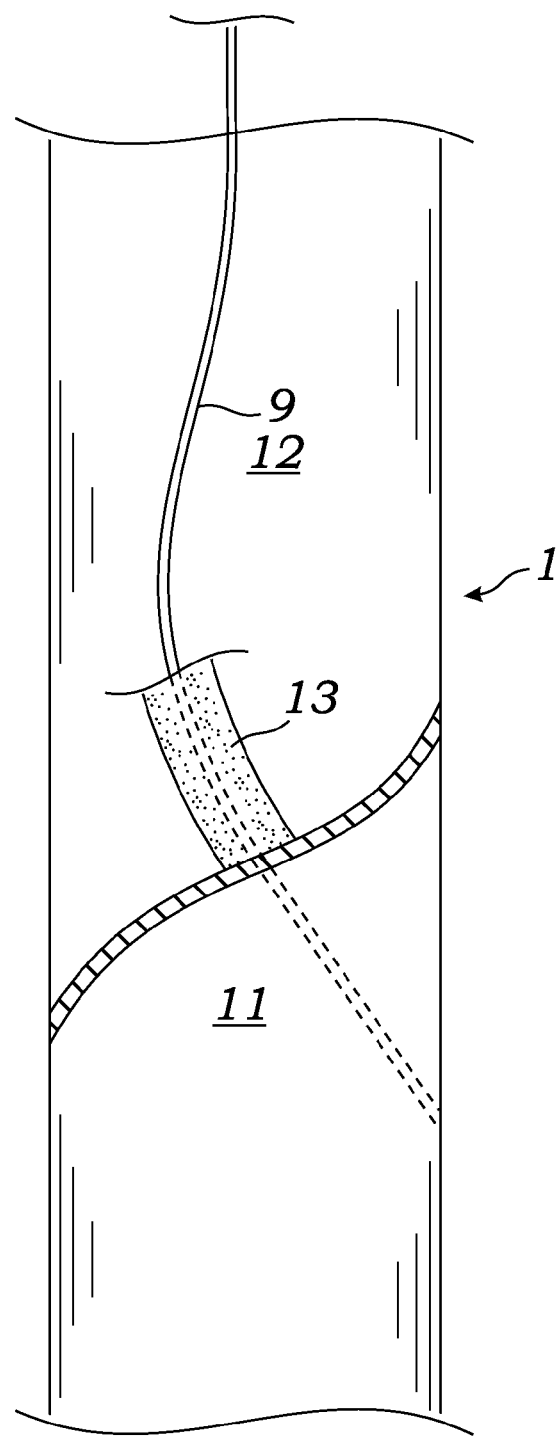
FIG. 4 is another embodiment, a breakaway of the outer protective layer, showing the optical fibers layer against the stress control layer, and showing a single optical fiber disposed in curvilinear fashion. Multiple optical fibers could be similarly disposed. Also represented in this embodiment are a sprayed on dielectric layer or a painted on dielectric layer or a molded in place dielectric layer or extruded or molded and applied dielectric layer over the optical fiber.

FIG. 4 is another embodiment, a breakaway of the outer protective layer 11, showing the optical fiber layer 9 disposed in curvilinear fashion against the stress control layer 12. Multiple optical fibers could be similarly disposed. Also represented in this embodiment are a sprayed on dielectric layer 13 which, instead, may be painted on dielectric layer or a molded in place dielectric layer or extruded or extruded or molded and applied dielectric layer over the optical fiber or a combination thereof. Dielectric layer 13 may be a tape-like strip or a wide band of dielectric. Also, the optical fiber 9 may be disposed linearly rather than curvilinearly. Such technique could be used at whatever level the optical fibers are located, between dielectric layers or otherwise.

Figure 5:
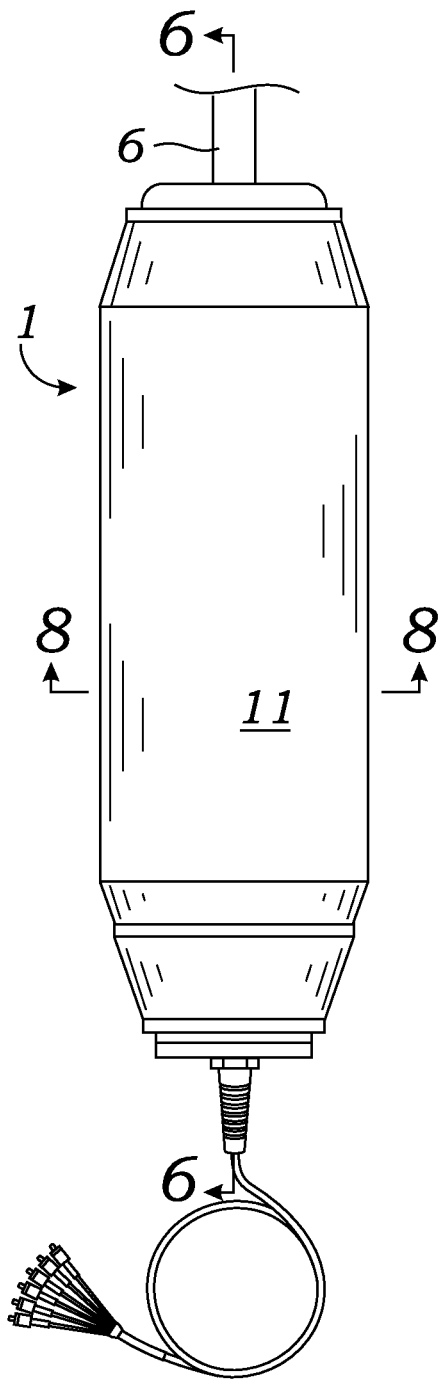
FIG. 5 is an exterior view of a high electrical stress termination of a high voltage cable, showing Sections taken on lines 6-6 for FIG. 6 and at 8-8 for FIG. 8.
Figure 6:
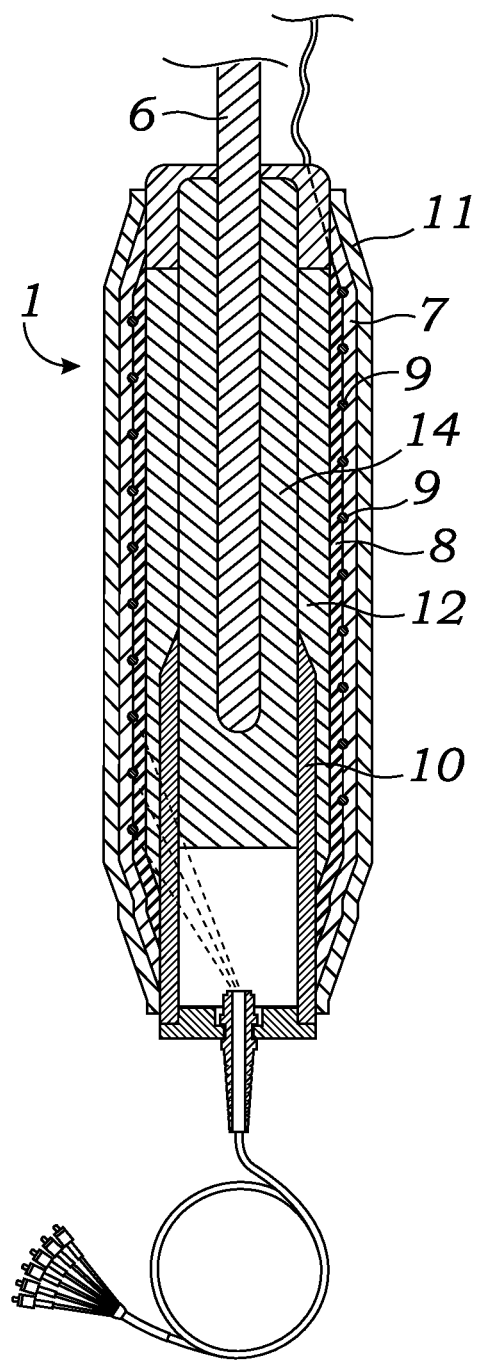
FIG. 6 is a cross-section view taken on line 6-6 of the embodiment of FIG. 5, illustrating the high voltage cable terminating within the stress control structure and having optical fibers therein.

FIG. 5 is an exterior view of the stress control structure 1 illustrating the termination of a high voltage structure 6 and showing the Sections taken at 6-6, FIG. 6 and at 8-8, FIG. 8.

FIG. 6 is a cross-section view taken on line 6-6 of the embodiment of FIG. 5, illustrating the high voltage structure 6 terminating within the stress control structure 1 and having optical fibers 9 therein. Also shown are outer protective layer 11, outer dielectric layer 7, inner dielectric layer 8, stress control layer 12, which is of high permittivity, (high dielectric), and the central longitudinal structure 14, which may, for example, be polycarbonate. A grounded metallic tube or cup 10 is shown which helps to establish the lower stress field or zero stress field at the bottom end of the embodiment.

FIG. 6 also illustrates a channel which extends into, but not through, the high voltage insulator 14 of the stress control structure 1, in which high voltage structure 6 is located. Such channel permits a wide use of the embodiment in connection with various other equipment. It is also noted in FIG. 10A, below, that the channel extends completely through the stress control structure 1, and is occupied by high voltage cable 20. This channel allows for wide use in connection with cables and other equipment.

FIG. 6A is a cross-section similar to the view of FIG. 6, but with the optical fibers 9 placed between the stress control layer 12 and the outer dielectric layer 7. In this embodiment, no inner dielectric layer 8 is used.

FIG. 7 is an embodiment of FIG. 5, showing the outer protective layer 11 and the outer dielectric layer 7 broken away to show the optical fibers 9 helically wound around an inner dielectric layer 8.

FIG. 8 is a cross-section view taken on line 8-8, of the embodiment of FIG. 5. Shown are the high voltage structure 6, the insulator 14, metal cup or tube 10, at lower electrical stress or zero electrical stress, (ground), stress control layer 12, inner dielectric layer 8, optical fibers 9, outer dielectric layer 7, and outer protective layer 11.

Figure 9:
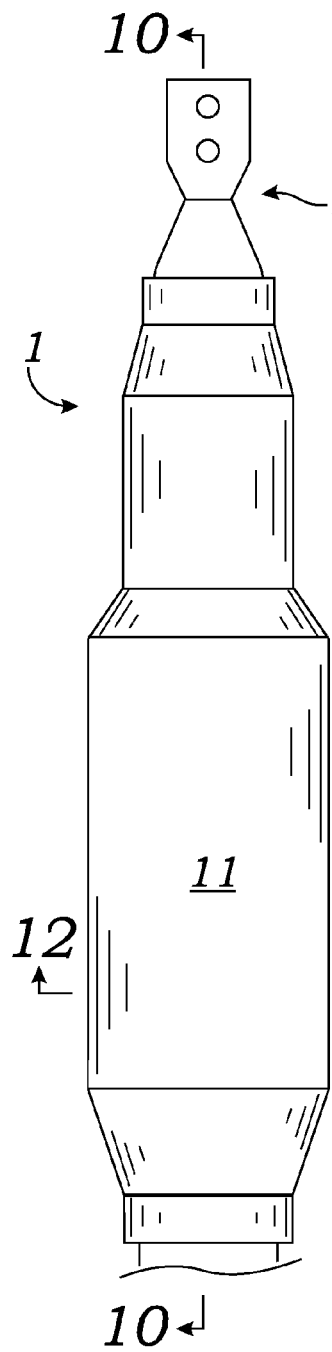
FIG. 9 is an exterior view of a termination of a high voltage cable.
Figure 10:
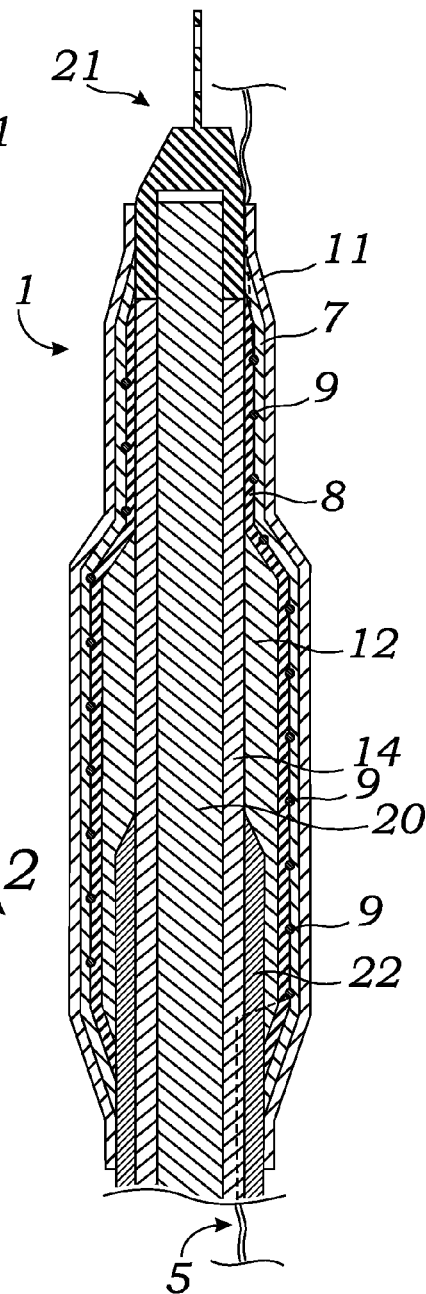
FIG. 10 is a cross-section view taken on line 10-10 in FIG. 9. of a termination of a high voltage cable, having optical fibers helically wound therein, which continue through the termination.

FIG. 9 is an exterior view of the stress control structure 1 used in the termination of a high voltage cable, by lower electrical stress or zero electrical stress metal lug 21 at the top of the embodiment. FIG. 10 is taken on section line 10-10 and FIG. 12 is taken on section 12-12.

FIG. 10 is a cross-section view taken on line 10-10 in FIG. 9 of a termination of a high voltage cable 20 having optical fibers 9 helically wound therein, which optical fibers continue throughout the termination. There is an outer protective layer 11, and an inner dielectric layer 8 with optical fibers 9 placed against it and covered by outer dielectric layer 7. Inside of inner dielectric layer 8, is stress control layer 12, high voltage insulator 14 and in its interior is the high voltage cable 20. Also shown are a semiconductive layer 22 with metal ground wires thereon (not shown) and entering optical fibers, (combined), 5 and leaving optical fibers, (combined) 4. In this embodiment, the high voltage cable 20, its high voltage insulator 14, (and any other elements coming with the particular high voltage cable), form the longitudinal structure of the embodiment.

Figure 10A:
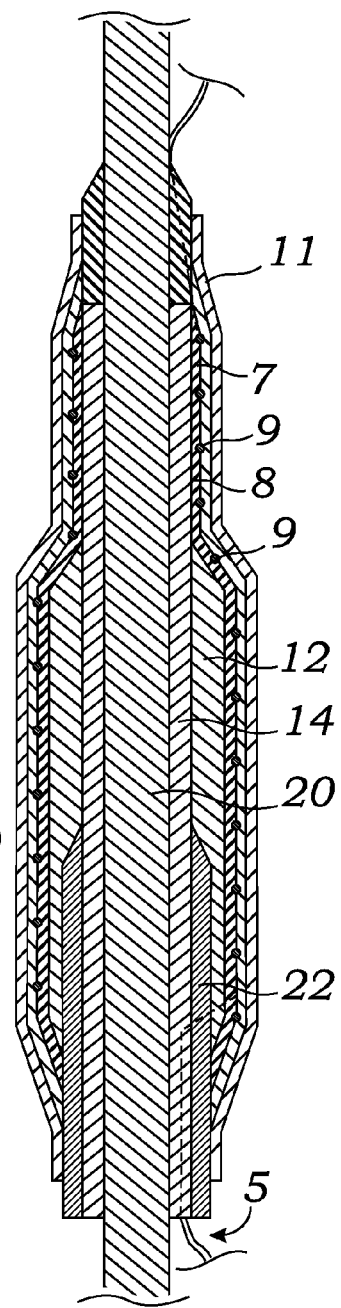
FIG. 10A is a cross-section view similar to that taken for FIG. 10, but having the electric cable extend through the device of the invention.

FIG. 10A is a cross-section view similar to that taken on line 10-10 of FIG. 9, for FIG. 10, but having the high voltage cable 20 extending through the stress control structure 1, with no terminating lug.

Figures 10B, 11, 12:
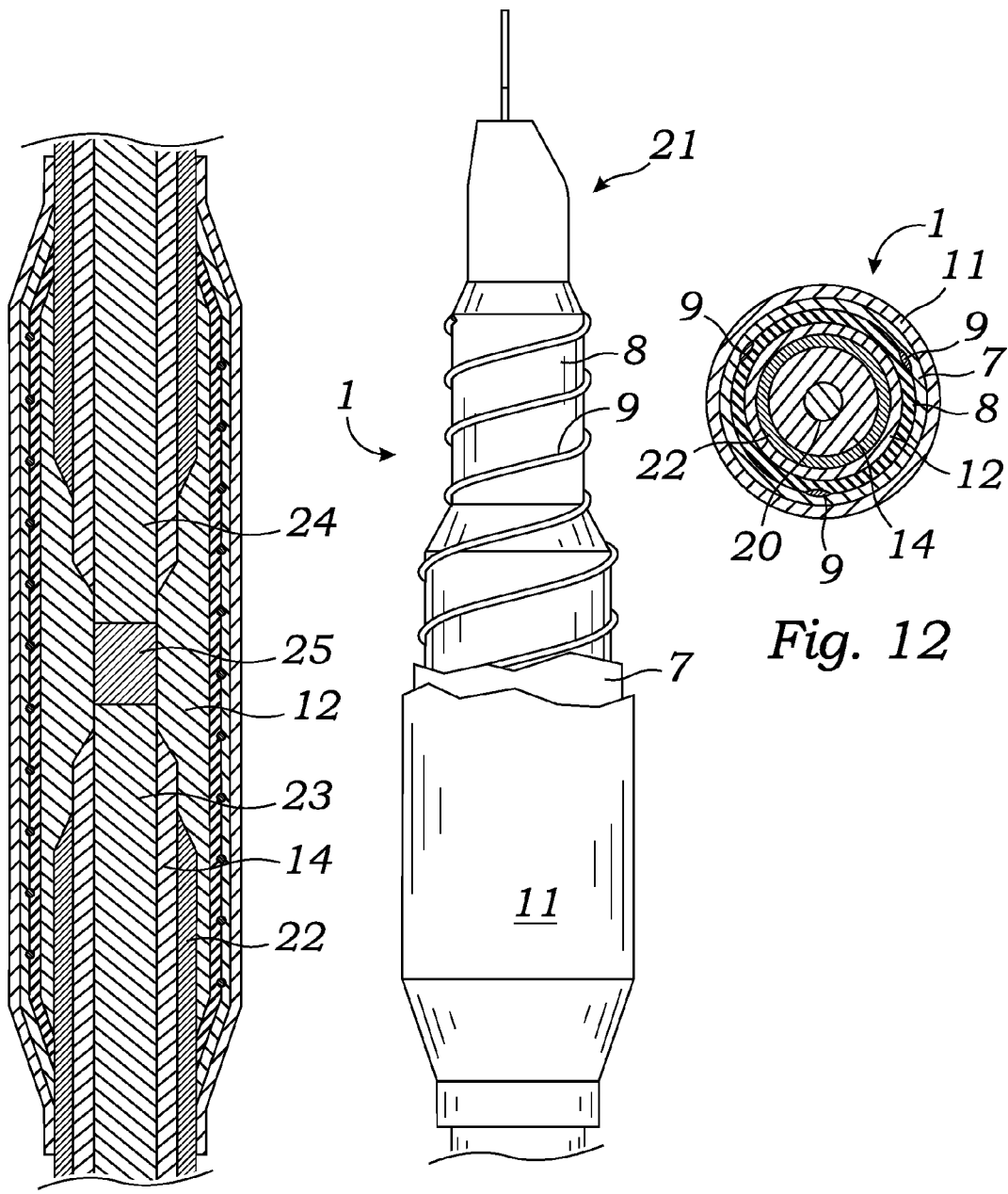
FIG. 10B is a cross-section of the device of the invention comprising a joint between the ends of two cables.
FIG. 11 is an exterior view of termination with two layers broken away, the outer protective layer and the first dielectric layer, showing the optical fiber cables helically wound on the inner dielectric layer.
FIG. 12 is a cross-section view of the termination taken at 12-12 in FIG. 9.

FIG. 10B is a cross-section similar to the lower half of the stress control structure 1 of FIG. 10 having the lower half inverted and placed above the lower half, to show a joint connection 25 of two high voltage cables 23 and 24. The stress control layer 12 widens to fill in the gap at the joint connection 25. The joint connection 25 may be a butt weld, soldered joint, crimping together, metal band or a tube or by any other suitable electrical joint.

FIG. 11 is an exterior view of a termination embodiment with two layers broken away, the outer protective layer 11 and the outer dielectric layer 7, showing the optical fibers 9 helically wound on the inner dielectric layer 8.

FIG. 12 is a cross-section view of the termination taken at 12-12 in FIG. 9. The layers shown are the high voltage cable 20, the cable insulator 14, the cable semiconductive layer 22, having metal ground wires (not shown), stress control layer 12 which is of high permittivity, inner dielectric layer 8, optical fibers 9, outer dielectric layer 7, and outer protective layer 11.

Figures 13, 14:
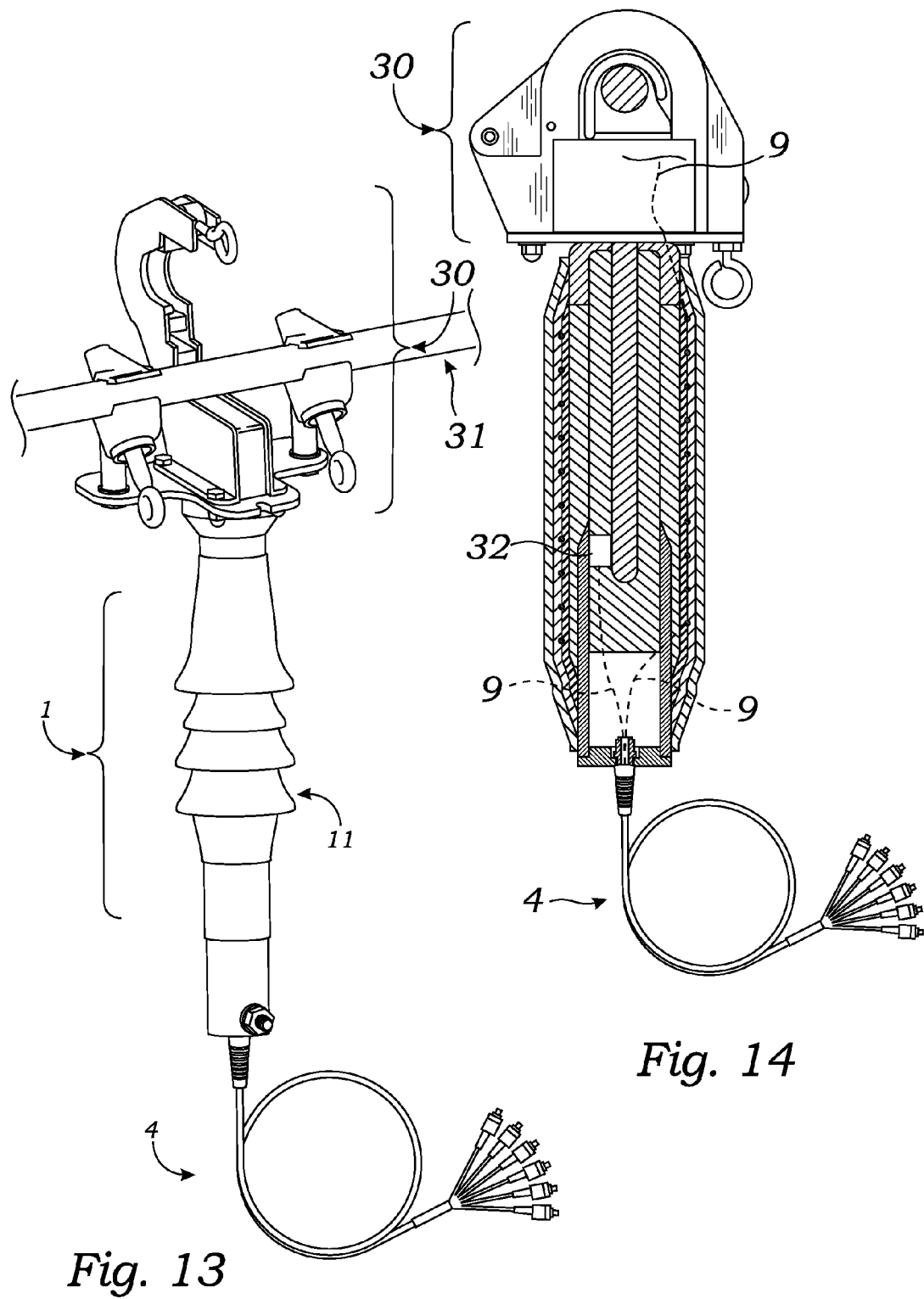
FIG. 13 is an exterior view of an electrical sensor attached to a high voltage cable.
FIG. 14 is cross-section view of the body of the device of the invention showing the various layers and the optical fibers for the current sensor as well as optical fibers for the voltage sensor.

FIG. 13 is an exterior view of an electrical sensor assembly 30 attached to a high voltage cable 31. The stress control structure 1 provides the support for the electrical sensor assembly 30, providing for passage therethrough of the optical fibers 4 associated with the electrical sensor assembly 30. The outer protective layer 11 of the stress control structure 1 can be seen as well as the combined optical fibers 4.

FIG. 14 is an exterior view of the electrical sensor assembly 30 disposed on top of a cross-section view of stress control structure 1. The various layers are those shown and described with reference to FIG. 6. In addition, the optical fibers 9 at the top of the drawing, associated with the current sensor portion of the electrical sensor assembly 30 are shown passing through the body of the stress control structure 1 and out into combined optical fibers 4. There is shown a voltage sensor 32 in the stress control structure 1, (sensing voltage of the high voltage cable 31). Optical fibers 9, associated with voltage sensor 32, pass through the lower end of the stress control structure and out into combined optical fibers 4.

The various items used in the electrical constructions herein are commercially available. All can be ordered by size, length, width, dielectric constant, conductivity or other relevant characteristics. The needs can be met over a wide range of voltages. Many suitable products are available from several suppliers. Of course, a wide range of optical fibers are also readily available.

We claim:

1. A stress control structure including one or more optical fibers adapted to be placed in a region or regions of high stress electrical field, the stress control structure comprising:
   a longitudinal structure that is centrally located and provides support for the stress control structure, and is electrically insulative at the highest voltage the device is designed for or having a higher dielectric constant;
   wherein said longitudinal structure is within a high stress electrical field at least, at or near, or within one end and thereby has created therein the high stress electrical field;
   one or more electric field stress control layers comprised of a high permittivity rubber or other high permittivity, flexible, conformable, insulative material, tightly-fitted around at least a portion of the length of the longitudinal structure, and creating a reduction along the longitudinal structure from the high stress electrical field down to a lower stress electrical field or zero stress electrical field;
   the one or more optical fibers extending at least from the high stress electrical field to the lower stress electrical field or zero stress electrical field, and disposed against the one or more stress control layers;
   one or more layers of conformable, dielectric material, covering at least the one or more optical fibers; and
   wherein the one or more optical fibers are contained tightly between the layer of conformable dielectric material and the one or more conformable electric field stress control layers.

2. The stress control structure of claim 1, wherein there is only one layer of conformable, dielectric material and it is sprayed on, painted on, molded or extruded and applied, or molded in place and wherein is included an outer protective layer.

3. The stress control structure of claim 1, further comprising a flexible outer protective layer which may be unitary or comprised of sections.

4. The stress control structure of claim 1, wherein the longitudinal structure has a channel in or near one end to receive the source or a portion of the source of the high stress electrical field.

5. The stress control structure of claim 1, wherein the optical fibers are disposed in one or more of the following arrangements:
   a. linearly;
   b. in a meandering path;
   c. in a helical path; and
   d. in a curved path.

6. The stress control structure of claim 3, wherein the flexible outer protective layer is comprised of a tight-fitting, highly electrically insulating sleeve, and wherein the sleeve extends long enough to cover the stress control layer or longer.

7. The stress control structure of claim 1, wherein the centrally-located, longitudinal structure is comprised primarily of a polycarbonate or of other rigid polymers or comprised of a high voltage cable and its associated layers.

8. The stress control structure of claim 3, wherein the flexible outer protective layer is comprised of a highly weather-resistant, hydrophobic material.

9. The stress control structure of claim 3, wherein the flexible outer protective layer comprises a highly insulative rubber, silicone rubber, or of various polymers or other materials having characteristics similar to rubber.

10. The stress control structure of claim 8, wherein the flexible outer protective layer has one or more exterior, outwardly extending skirts to decrease susceptibility to exterior tracking and arcing.

11. The stress control structure of claim 1, further comprising one or more additional layers of conformable dielectric material disposed between the one or more optical fibers and the one or more electric field stress control layers, whereby the one or more optical fibers are tightly disposed between two conformable, dielectric layers.

12. The stress control structure of claim 1, further comprising:
   one or more additional layers of conformable dielectric material disposed at some location between the stress control layer and the outer protective layer; and
   wherein one or more additional optical fibers are disposed between the additional layers of dielectric material.

13. The stress control structure of claim 11, wherein one or more of the conformable, dielectric layers is sprayed on, painted on, molded or extruded and applied, or molded in place.

14. The stress control structure of claim 11, wherein the dielectric material adjacent one or both sides of the optical fibers, is one or more of sheet form or tape form.

15. The stress control structure of claim 11, wherein the first and second layers of conformable dielectric material are of self-fusing silicon, and wherein the optical fibers are tightly disposed between the two layers of self fusing silicon.

16. The stress control structure of claim 15 wherein the first and second layers of self-fusing silicon are one or both in tape form or sheet form.

17. The stress control structure of claim 11, further comprising:
an electrical sensor assembly adapted for attachment to a high voltage cable, for sensing one or more of the current and the voltage therein, sensor temperature, cable temperature or other sensed parameters and providing the output on the one or more optical fibers;
wherein the electrical sensor assembly when attached to the high voltage cable provides the high stress electrical field;
wherein the optical fibers extend at least from the high stress electrical field down to the lower stress or zero stress electrical field, and are adapted for further connection.

18. The stress control structure of claim 11, wherein the flexible outer protective layer is comprised of a highly weather-resistant, hydrophobic, highly insulative rubber, silicone rubber or of various polymers or other materials having characteristics similar to rubber.

19. The stress control structure of claim 18, wherein the flexible outer protective layer has one or more exterior, outwardly extending skirts to decrease susceptibility to exterior tracking or arcing.

20. A stress control structure including one or more optical fibers adapted to be placed in a region or regions of high stress electrical field, comprising:
a longitudinal stress control structure that is strong, stiff, centrally-located in and provides support for the stress control structure, and is electrically insulative at the highest voltage the device is designed for or having a higher dielectric constant;
wherein the longitudinal structure is within, at least, at or near or within one end, the high stress electrical field so as to create within the longitudinal structure, the high stress electrical field;
one or more electric field stress control layers comprised of a high permittivity rubber or other high permittivity, flexible, insulative material, disposed tightly around and along the length of, or a portion of the length of, the longitudinal structure and creating a reduction of the high stress electrical field down to a lower stress or zero stress electrical field;
a first layer of conformable, dielectric material, disposed against the one or more stress control layers;
the one or more optical fibers disposed against the first layer of conformable dielectric material and extending approximately the length of the longitudinal structure or longer, or at least from the high stress electrical field to the lower stress or zero stress electrical field;
a second layer of conformable, dielectric material placed against the first layer of conformable, dielectric material and covering the at least one or more optical fibers at least from the high stress electrical field to the lower stress electrical field or zero stress electrical field;
wherein the one or more optical fibers are contained tightly between the first and second layers of conformable dielectric material; and
a flexible outer protective layer which may be unitary or comprised of sections.

21. The stress control structure of claim 20, further comprising:
one or more additional layers of conformable dielectric material disposed at some location between the stress control layer and the outer protective layer; and
wherein one or more additional optical fibers are disposed between the additional layers of dielectric material.

22. The stress control structure of claim 20, wherein the flexible outer protective layer has one or more exterior, outwardly extending skirts to decrease susceptibility to exterior tracking and arcing.

23. The stress control structure of claim 20 wherein the flexible outer protective layer is comprised of a tight-fitting, highly electrically insulating sleeve, wherein the sleeve extends long enough to cover the stress control layer or longer.

24. The stress control structure of claim 20, wherein the optical fibers are disposed in one or more of the following arrangements:
a. linearly;
b. in a meandering path;
c. in a helical path; and
d. in a curved path.

25. The stress control structure of claim 20, wherein the flexible outer protective layer is comprised of a highly weather-resistant, hydrophobic material.

26. The stress control structure of claim 20, wherein the flexible outer protective layer is comprised of highly insulative rubber, silicone rubber or of various polymers or other materials having characteristics similar to rubber.

27. The stress control structure of claim 20, wherein the longitudinal structure is comprised of a polycarbonate or other rigid polymers or a high voltage cable and its associated layers.

28. The stress control structure of claim 20, wherein one or both of the conformable dielectric layers is sprayed on, painted on, molded or extruded and applied, or molded in place.

29. The stress control structure of claim 20, wherein the first and second layers of conformable dielectric material are comprised of a self-fusing material in which the first layer has a self-fusing face disposed outwardly and the second layer has a self-fusing face disposed inwardly, wherein the one or more optical fibers are contained tightly between two layers of self-fusing material.

30. The stress control structure of claim 29, wherein the self-fusing material is silicon.

31. The stress control structure of claim 29, wherein the two layers of self-fusing material are pressed together around the one or more optical fibers so as to remove or minimize the number and size of air gaps around the optical fiber or optical fibers.

32. The stress control structure of claim 29, wherein the two layers of self-fusing material are one or both in one or both tape form or sheet form.

33. The stress control structure of claim 29, wherein the two layers of self-fusing material are in a form of painted on, sprayed on, extruded, molded in place or are preformed and applied.

34. The stress control structure of claim 26, wherein the flexible outer protective layer has one or more exterior, outwardly extending skirts to decrease susceptibility to exterior tracking or arcing.

35. The stress control structure of claim 20, wherein the longitudinal structure is one or more of the following in cross-section:
circular or near-circular,
multi-sided, and
tapered.

36. The stress control structure of claim 20, wherein the longitudinal structure is has a channel at or near one end to receive the source of the high stress electrical field.

37. The stress control structure of claim 20, wherein the longitudinal structure has a channel at or near one end to receive a conductor of the voltage of the cable.

38. The stress control structure of claim 20 wherein the longitudinal structure has a centrally-located channel therethrough.

39. The stress control structure of claim 20, further comprising:
- an electrical sensor assembly adapted for attachment to a high voltage cable, for sensing one or more of the current and the voltage therein, sensor temperature, cable temperature or other sensed parameters and providing the output on the one or more optical fibers;
- wherein the electrical sensor assembly attached to the high voltage cable provides the source of the high stress electrical field; and
- wherein the optical fibers extend from the high stress electrical field down to the lower stress or zero stress electrical field.

40. The stress control structure of claim 39, wherein the flexible outer protective layer is comprised of a highly weather-resistant, hydrophobic, highly insulative rubber, silicone rubber or of various polymers or other materials having characteristics similar to rubber.

41. The stress control structure of claim 39, wherein the source of the high stress electrical field extends into the longitudinal structure either at one end of the longitudinal structure or from the side at or near the one end of longitudinal structure.

42. The stress control structure of claim 20, wherein the stress control layer is comprised of an elastomeric composition of EPDM or EPM incorporating suitable fillers of carbon black and platelet metallic flakes, and, possibly, additional high permittivity inorganic fillers.

43. The stress control structure of claim 20, wherein the stress control layer is comprised of a high permittivity, elastomeric polymer impregnated with epihalohydrin.

44. The stress control structure of claim 29, wherein the self-fusing, conformable dielectric material is comprised of one or more of rubber, silicone elastomers and other elastomeric compounds.

45. A stress control structure including one or more optical fibers adapted to be placed in a region or regions of high stress electrical field, the stress control structure comprising:
- a longitudinal structure that is strong, stiff, centrally-located in the stress control structure, and is electrically insulative, at the highest voltage the device is designed for or of a higher dielectric constant;
- wherein said longitudinal structure is disposed at one end in or near an electrical sensor assembly adapted to be attached to a high voltage cable and to sense current or voltage or both, in the high voltage cable, and providing the one or more optical fibers, whereby when the electrical sensor assembly is in operation, the high stress electrical field caused by the high voltage cable creates in the one end of the longitudinal structure, the high stress electrical field;
- one or more electric field stress control layers comprised of a high permittivity rubber or other high permittivity, flexible, insulative material tightly-fitted around the longitudinal structure along the length of or at least a portion of the length of the longitudinal structure and creating a reduction from the high stress electrical field down to a lower stress or zero stress electrical field;
- a first layer of conformable, dielectric material, disposed against the one or more stress control layers and extending for approximately the length of the longitudinal structure or at least from the high stress electrical field to the lower stress or zero stress electrical field;
- wherein the one or more optical fibers, which are associated with the electrical sensor assembly, extend approximately the length of the longitudinal structure or longer and are disposed against the first layer of conformable dielectric material;
- a second layer of conformable, dielectric material, covering the at least the one or more optical fibers for approximately the length of the longitudinal structure or at least from the high stress electrical field to the lower stress or zero stress electrical field;
- wherein the one or more optical fibers are contained tightly between the first and second layers of conformable dielectric material; and
- wherein is included a highly weather-resistant, hydrophobic, flexible outer layer comprising a tight-fitting, highly electrically insulating sleeve, wherein the sleeve extends approximately the length of the longitudinal structure or longer.

46. The stress control structure of claim 45, further comprising:
- one or more additional layers of conformable dielectric material disposed at some location between the stress control layer and the outer protective layer; and
- wherein one or more additional optical fibers are disposed between the additional layers of dielectric material.

47. The stress control structure of claim 45, wherein the first and second layers of conformable dielectric material are comprised of self-fusing silicon in which the first layer has a self-fusing face disposed outwardly and the second layer has a self-fusing face disposed inwardly, wherein the one or more optical fibers are contained tightly between two layers of self-fusing silicon.

48. A method of protecting one or more optical fibers supported by a longitudinal structure having at least one end thereof in a high stress electrical field, the method comprising the steps of:
- reducing the electrical stress in the direction of the length of the longitudinal structure to a lower stress electrical field, or to a zero stress electrical field of ground level;
- dielectrically insulating the optical fibers at least from the high stress electrical field to the lower stress electrical field or zero stress electrical field, by at least one conformable layer of dielectric material and removing or minimizing the number and size of air gaps along or near the optical fibers; and
- providing a tight-fitting, exterior, insulative layer extending at least the length of the longitudinal structure.

49. The method of claim 48, wherein the provided tight-fitting, exterior, insulative layer is also, highly weather-resistant, hydrophobic and flexible.

50. The method of claim 48, wherein the step of dielectrically insulating the one or more optical fibers further comprises the step of dielectrically insulating the one or more optical fibers by a conformable dielectric layer on each side of the one or more optical fibers.

51. The method of claim 48, further comprising the step of using self-fusing silicon as the dielectric layer on each side of the one or more optical fibers.

52. The method of claim 48, wherein the step of dielectrically insulating the one or more optical fibers is one or more of sprayed on, painted on, molded or extruded and applied, or molded in place.

53. A stress control structure including one or more optical fibers that are adapted to be located at least partially in a region of high stress electrical field, the stress control structure comprising:
- a longitudinal structure that provides support for the stress control structure, and is electrically insulative at the highest voltage the device is designed for or having a higher dielectric constant;
- one or more electric field stress control layers comprising a high permittivity rubber or other high permittivity, flexible, conformable, insulative material, tightly-fitted around at least a portion of the length of the longitudinal structure, and creating a reduction along the longitudinal structure from the high stress electrical field down to a lower stress electrical field or zero stress electrical field;
- the one or more optical fibers being disposed against the one or more stress control layers; and
- one or more layers of conformable, dielectric material, covering at least the one or more optical fibers, such that the one or more optical fibers are contained tightly between the layer of conformable dielectric material and the one or more conformable electric field stress control layers.

* * * * *